United States Patent
Kosaka et al.

Patent Number: 6,023,044
Date of Patent: Feb. 8, 2000

[54] CONTROL METHOD IN MULTI-LAYER WELDING

[75] Inventors: Tetsuya Kosaka; Yoshitaka Ikeda, both of Yamanashi, Japan

[73] Assignee: Fanuc Ltd., Yamanashi, Japan

[21] Appl. No.: 08/981,818

[22] PCT Filed: Apr. 14, 1997

[86] PCT No.: PCT/JP97/01288

§ 371 Date: Dec. 12, 1997

§ 102(e) Date: Dec. 12, 1997

[87] PCT Pub. No.: WO97/38819

PCT Pub. Date: Oct. 23, 1997

[30] Foreign Application Priority Data

Apr. 12, 1996 [JP] Japan ................................. 8-114371

[51] Int. Cl.$^7$ .................................................. B23K 9/12
[52] U.S. Cl. ................................ 219/124.34; 219/125.1; 901/42
[58] Field of Search ........................ 219/124.34, 125.1, 219/125.11, 125.12, 137 R, 137 PS; 901/42

[56] References Cited

U.S. PATENT DOCUMENTS

| 4,144,992 | 3/1979 | Omae et al. ................. 219/125.11 |
| 4,532,404 | 7/1985 | Boillot et al. .................. 219/124.34 |
| 4,816,640 | 3/1989 | Sugitani et al. ................ 219/137 PS |
| 5,107,093 | 4/1992 | Ekelof et al. ................... 219/124.34 |
| 5,532,452 | 7/1996 | Lechner et al. ................. 219/124.34 |
| 5,534,676 | 7/1996 | Rinaldi et al. .................. 219/124.34 |

FOREIGN PATENT DOCUMENTS

| 58-187269 | 11/1983 | Japan . |
| 61-226179 | 10/1986 | Japan ................................. 219/137 R |
| 62-267607 | 11/1987 | Japan . |
| 6-320462 | 11/1994 | Japan . |
| 7-80643 | 3/1995 | Japan . |
| 8-197248 | 8/1996 | Japan . |

*Primary Examiner*—Clifford C. Shaw
*Attorney, Agent, or Firm*—Staas & Halsey LLP

[57] ABSTRACT

In a multi-layer welding, weld line and a gap width of workpieces (A, B) to be welded are detected by a laser sensor mounted on a robot, during a welding for a first layer, whereby, a welding torch mounted on the robot is made to follow the weld line and welding conditions are adjusted in accordance with the detected gap width. The detected gap width is stored in the storage means together with the weld line data. Then, weldings for a second and subsequent layers are performed by using the stored data in such a manner that the welding torch is made to follow the weld line, and the welding conditions are adjusted in accordance with the gap width.

10 Claims, 13 Drawing Sheets

FIG. 8

```
 1 : INDIVIDUAL AXIS POSITION [1]  100% POSITIONING
 2 : INDIVIDUAL AXIS POSITION [2]   40% POSITIONING
   : START ARC [1]
 3 : TRACKING MIGEYE [3]  PATH DATA [2]
 4 : LINE POSITION [3]   25mm/sec  SMOOTHNESS 100
 5 : LINE POSITION [4]   20mm/sec  SMOOTHNESS 100
 6 : LINE POSITION [5]   25mm/sec  POSITIONING
   : FINISH ARC [1]
 7 : FINISH TRACKING
 8 : INDIVIDUAL AXIS POSITION [6]   40% POSITIONING
 9 : MULTI-LAYER WELDING POSITION REGISTER [4]  PATH DATA [2]
10 : LINE POSITION [2]   200mm/sec  SMOOTHNESS 100
   : START ARC [1]
11 : LINE POSITION [3]   25mm/sec  SMOOTHNESS 100
12 : LINE POSITION [4]   20mm/sec  SMOOTHNESS 100
13 : LINE POSITION [5]   25mm/sec  POSITIONING
   : FINISH ARC [1]
14 : FINISH MULTI-LAYER WELDING
15 : INDIVIDUAL AXIS POSITION [6]   40% POSITIONING
16 : MULTI-LAYER WELDING POSITION REGISTER [5]  PATH DATA [2]
17 : LINE POSITION [2]   200mm/sec  SMOOTHNESS 100
   : START ARC [1]
18 : LINE POSITION [3]   25mm/sec  SMOOTHNESS 100
19 : LINE POSITION [4]   20mm/sec  SMOOTHNESS 100
20 : LINE POSITION [5]   25mm/sec  POSITIONING
   : FINISH ARC [1]
21 : FINISH MULTI-LAYER WELDING
22 : INDIVIDUAL AXIS POSITION [6]   40% POSITIONING
23 : MULTI-LAYER WELDING POSITION REGISTER [6]  PATH DATA [2]
24 : LINE POSITION [2]   200mm/sec  SMOOTHNESS 100
   : START ARC [1]
25 : LINE POSITION [3]   25mm/sec  SMOOTHNESS 100
26 : LINE POSITION [4]   20mm/sec  SMOOTHNESS 100
27 : LINE POSITION [5]   25mm/sec  POSITIONING
   : FINISH ARC [1]
28 : FINISH MULTI-LAYER WELDING
29 : INDIVIDUAL AXIS POSITION [6]   40% POSITIONING
30 : MULTI-LAYER WELDING POSITION REGISTER [7]  PATH DATA [2]
31 : LINE POSITION [2]   200mm/sec  SMOOTHNESS 100
   : START ARC [1]
32 : LINE POSITION [3]   25mm/sec  SMOOTHNESS 100
33 : LINE POSITION [4]   20mm/sec  SMOOTHNESS 100
34 : LINE POSITION [5]   25mm/sec  POSITIONING
   : FINISH ARC [1]
35 : FINISH MULTI-LAYER WELDING
36 : INDIVIDUAL AXIS POSITION [6]   40% POSITIONING
37 : MULTI-LAYER WELDING POSITION REGISTER [8]  PATH DATA [2]
31 : LINE POSITION [2]   200mm/sec  SMOOTHNESS 100
   : START ARC [1]
32 : LINE POSITION [3]   25mm/sec  SMOOTHNESS 100
33 : LINE POSITION [4]   20mm/sec  SMOOTHNESS 100
34 : LINE POSITION [5]   25mm/sec  SMOOTHNESS
   : FINISH ARC [1]
35 : FINISH MULTI-LAYER WELDING
```

- TRACKING SECTION OF FIRST LAYER (lines 3–7)
- MULTI-LAYER WELDING SECTION OF SECOND LAYER (lines 9–14)
- MULTI-LAYER WELDING SECTION OF THIRD LAYER (lines 16–21)
- MULTI-LAYER WELDING SECTION OF FOURTH LAYER (lines 23–28)
- MULTI-LAYER WELDING SECTION OF FOURTH LAYER (lines 30–35)
- MULTI-LAYER WELDING SECTION OF FIFTH LAYER (lines 37–35)

FIG. 10

```
CONDITION 1
· · · · · · · · · · · · · · · · · · · · · · · · · · · · · · · · · · · · · · · · · · ·
· · · · · · · · · · · · · · · · · · · · · · · · · · · · · · · · · · · · · · · · · · ·
 1 2 :  Y-DIRECTION OFFSET                          + 3. 0 mm
 1 3 :  Z-DIRECTION OFFSET                          - 2. 0 mm
· · · · · · · · · · · · · · · · · · · · · · · · · · · · · · · · · · · · · · · · · · ·
 1 5 :  ADAPTIVE WELDING SCHEDULE                       0
 1 6 :  MULTI-LAYER ADAPTIVE WELDING                 INVALID
 1 7 :  MULTI-LAYER ADAPTIVE WELDING               <PARTICULARS>
· · · · · · · · · · · · · · · · · · · · · · · · · · · · · · · · · · · · · · · · · · ·
CONDITION 2
· · · · · · · · · · · · · · · · · · · · · · · · · · · · · · · · · · · · · · · · · · ·
· · · · · · · · · · · · · · · · · · · · · · · · · · · · · · · · · · · · · · · · · · ·
 1 2 :  Y-DIRECTION OFFSET                          + 1. 0 mm
 1 3 :  Z-DIRECTION OFFSET                          - 2. 5 mm
· · · · · · · · · · · · · · · · · · · · · · · · · · · · · · · · · · · · · · · · · · ·
 1 5 :  ADAPTIVE WELDING SCHEDULE                       0
 1 6 :  MULTI-LAYER ADAPTIVE WELDING                EFFECTIVE
 1 7 :  MULTI-LAYER ADAPTIVE WELDING               <PARTICULARS>
· · · · · · · · · · · · · · · · · · · · · · · · · · · · · · · · · · · · · · · · · · ·
CONDITION 3
· · · · · · · · · · · · · · · · · · · · · · · · · · · · · · · · · · · · · · · · · · ·
· · · · · · · · · · · · · · · · · · · · · · · · · · · · · · · · · · · · · · · · · · ·
 1 2 :  Y-DIRECTION OFFSET                          + 3. 0 mm
 1 3 :  Z-DIRECTION OFFSET                          - 2. 0 mm
· · · · · · · · · · · · · · · · · · · · · · · · · · · · · · · · · · · · · · · · · · ·
 1 5 :  ADAPTIVE WELDING SCHEDULE                       3
 1 6 :  MULTI-LAYER ADAPTIVE WELDING                EFFECTIVE
 1 7 :  MULTI-LAYER ADAPTIVE WELDING               <PARTICULARS>
· · · · · · · · · · · · · · · · · · · · · · · · · · · · · · · · · · · · · · · · · · ·
CONDITION 4
· · · · · · · · · · · · · · · · · · · · · · · · · · · · · · · · · · · · · · · · · · ·
· · · · · · · · · · · · · · · · · · · · · · · · · · · · · · · · · · · · · · · · · · ·
 1 2 :  Y-DIRECTION OFFSET                          + 2. 0 mm
 1 3 :  Z-DIRECTION OFFSET                          - 3. 0 mm
· · · · · · · · · · · · · · · · · · · · · · · · · · · · · · · · · · · · · · · · · · ·
 1 5 :  ADAPTIVE WELDING SCHEDULE                       1
 1 6 :  MULTI-LAYER ADAPTIVE WELDING                EFFECTIVE
 1 7 :  MULTI-LAYER ADAPTIVE WELDING               <PARTICULARS>
· · · · · · · · · · · · · · · · · · · · · · · · · · · · · · · · · · · · · · · · · · ·
```

FIG. 11

```
MULTI-LAYER ADAPTIVE WELDING SCHEDULE
1.    SECOND LAYER SCHEDULE                              [3]
2.    THIRD LAYER SCHEDULE                               [3]
3.    FOURTH LAYER SCHEDULE                              [3]
4.    FIFTH LAYER SCHEDULE                               [2]

[SCREEN]          SUMMARY
```

FIG. 12

```
   DATA ADAPT SCHEDULE
   SCHEDULE 1 [                                        ]   1/6
   ..................................................
   SCHEDULE 2 [                                        ]   2/6
       RANGE (mm)  WELDING  V (mm/sec)  Y (mm)  Z (mm)  WEAVING  TARGET  ADVANCE
   1.  0.0         3        30          +0.00   -0.00   1        0       0
   2.  2.0         3        30          +0.50   -2.00   3        0       0
   3.  3.5         3        25          +0.60   -2.00   3        0       0
   4.  4.0         3        20          +0.80   -2.00   5        0       0
   5.  5.2         1        30          +1.00   -2.00   8        0       0
   6.  8.0         ***      ****        ****    ****    ****     ****    ****

SCHEDULE 3 [                                        ]   3/6
       RANGE (mm)  WELDING  V (mm/sec)  Y (mm)  Z (mm)  WEAVING  TARGET  ADVANCE
   1.  0.0         4        30          +0.00   -0.00   1        0        0
   2.  2.0         2        30          +0.50   -2.00   1        0        0
   3.  3.5         2        25          +0.60   -2.00   2        0       -5
   4.  4.0         3        20          +0.80   -2.00   4        +5     -10
   5.  5.2         1        30          +1.00   -2.00   8        +5     -15
   6.  8.0         ***      ****        ****    ****    ****     ****    ****
   ..................................................
   ..................................................

WELDING         VOLTAGE (kv)         CURRENT (A)
   1               2.50                 1.80
   2               2.70                 2.05
   3               2.90                 2.26
   4               3.30                 2.62
   5               3.50                 2.77

WEAVING         PATTERN              AMPLITUDE (mm)
   1               1                    3.00
   2               1                    4.00
   3               1                    5.00
   4               2                    2.00
   6               2                    3.00
   7               2                    2.00
   8               3                    5.00
   9               3                    8.00
```

CONTROL METHOD IN MULTI-LAYER WELDING

BACKGROUND OF THE INVENTION

1. Field of the Invention

The present invention relates to a technique for performing a multi-layer welding by using a robot having a torch for arc welding mounted thereon, and more specifically relates to a technique for performing adaptive welding control by using a laser sensor during multi-layer welding.

2. Related Art

A technique for making a robot to track a weld line by using data which has been obtained by sensing the weld line in advance by a laser sensor mounted on the robot together with a torch for arc welding is widely known as a real time tracking control by a robot. Further, this real time tracking control is applied to a robot which performs a multi-layer welding.

In the case of making the robot on which the laser sensor is mounted to perform a multi-layer welding, the data concerning the weld line can be obtained by sensing of the laser sensor while the robot moves for welding for a first layer. In the conventional art, a control method is employed, in which a part of or all of the data obtained by sensing during the first-layer welding are stored within a robot controller and the robot is moved, by reading the previously stored data, for welding for a second and subsequent layers (for example, refer to Japanese Patent Publication, Kokai No. 6-320462). The above method is greatly useful in keeping a good quality of the multi-layer welding, since robot moving paths in a second and subsequent layers are suitably controlled.

On the other hand, the quality of the arc welding is also influenced by welding conditions such as a welding current, a welding voltage, a welding speed (a moving speed of a robot), an offset amount of a tip position of a welding torch, etc. Particularly, in a butt welding or a lap welding, a suitable value of each of these conditions is influenced by a size of a gap (hereinafter referred to as "a gap width") existing between welding joints (that is, a gap between workpieces to be welded). For example, since a suitable width of a weld bead is normally changed in accordance with the gap width, it is necessary to change the welding condition accordingly. However, a gap width is not always constant throughout a weld section. Then, there is suggested a method in which, for the welding in accordance with the real time tracking method employing a laser sensor, the gap width is also detected so that the welding conditions such as a welding current and a welding voltage can also be controlled on real time basis depending on the detected gap width (refer to Japanese Patent Publication, Kokai No. 7-80643). A method of arc welding where welding conditions are controlled in accordance with a transition of a gap condition is generally called "adaptive welding control".

In the multi-layer welding, controlling of welding conditions in accordance with a gap width in welding for a second and subsequent layers will inevitably become necessary. For example, in the case where the gap width of a welding joint is large, it is naturally necessary to increase the width of the weld bead not only for the first layer but also for the second and subsequent layers accordingly. However, in order to satisfy this requirement, it is considered necessary that an adaptive welding control should be applied to welding for a second and subsequent layers.

However, in welding for a second and subsequent layers using a conventional multi-layer welding method, the weld line detection by the laser sensor has not been used in general, so that an adaptive welding control described in the above Japanese Patent Publication, Kokai No. 7-80643, has never been applied to a welding for a second and subsequent layers in the multi-layer welding.

Thus, in order to perform an adaptive welding control in welding for a second and subsequent layers in the multi-layer welding, it is considered to be preferable that the detection by a laser sensor be performed in welding for a second and subsequent layers in the same manner as that in welding for a first layer. However, if this method is used in multi-layer welding, the bead gradually swells as welding proceeds in the second layer, the third layer, and so on, it is difficult, and may be impossible, for the laser sensor to clearly discriminate an edge of the welded joint. In this case, even if the laser sensor can detect the edge of the welded joint in the welding for a second and the following layers, an operation efficiency will deteriorate as the laser sensor has to repeat the same operation for detecting the gap width in welding for every layer in the multi-layer welding.

SUMMARY OF THE INVENTION

An object of the present invention is to provide a control method for multi-layer welding using a welding robot on which a laser sensor is mounted, in which welding condition according to a gap width between workpieces to be welded can be applied to welding for a second and subsequent layers in the same manner as that in a welding of a first layer.

In order to achieve the above object, a control method in a multi-layer welding in accordance with the present invention, which uses a welding robot mounting an arc welding torch and a laser sensor, comprises the following steps: (a) a step of previously setting a relation between a width of a gap existing in a portion of an object to be welded and a welding condition; (b) a step of continuously or successively detecting the width of the gap existing in the portion of an object to be welded along a weld path, thereby storing a detected data concerning the gap width into memory means and performing a welding of a first layer while simultaneously controlling, on real-time basis, the welding conditions corresponding to the detected gap width; and (c) a step of performing a welding for a second and subsequent layers along the weld path while simultaneously controlling the welding conditions, on a real time basis, corresponding to the gap width stored in the memory means.

Since the control method in the multi-layer welding in accordance with the present invention has the above structure, the welding conditions corresponding to the gap width between the workpieces to be welded can also be applied to welding for the second and subsequent layers in the multi-layer welding by using the arc welding robot, so that the improvement in the quality of the multi-layer welding can be expected.

BRIEF DESCRIPTION OF THE DRAWINGS

FIG. 8 is a diagram explaining an operation program in accordance with an embodiment of the present invention;

FIG. 10 is an example of a screen for setting a tracking conditions in accordance with an embodiment of the present invention;

FIG. 11 is an example of a screen for setting an adaptive welding schedule in accordance with an embodiment of the present invention;

FIG. 12 is an example of a screen for setting adaptive welding conditions in accordance with an embodiment of the present invention;

BEST MODE FOR CARRYING OUT THE INVENTION

A basic arrangement for applying the present invention to a butt welding and detection of a gap width will be described below with reference to a schematic diagram of FIG. 1.

Figure 1:
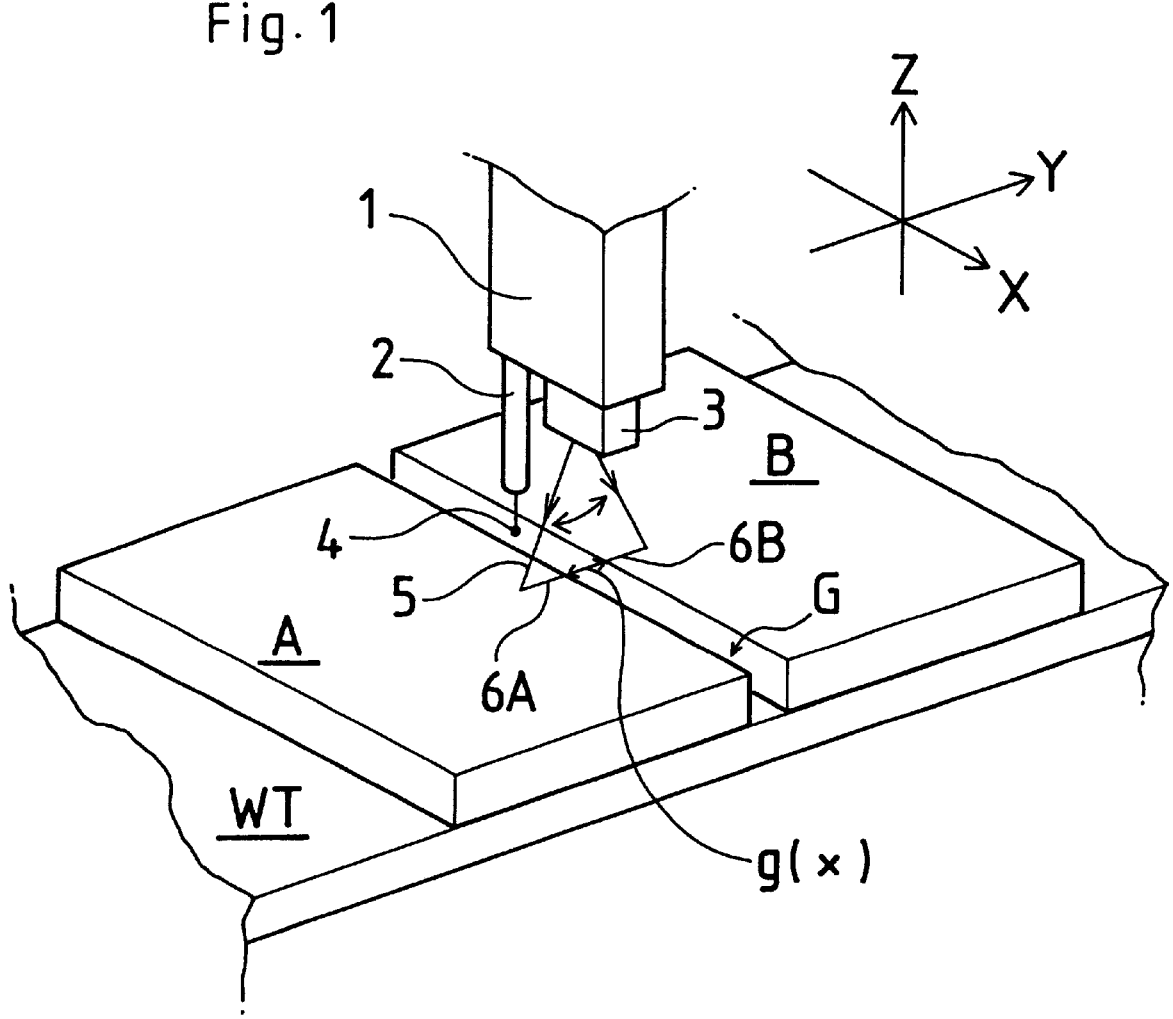
FIG. 1 is a schematic diagram explaining a basic arrangement for applying the present invention to a butt welding and detection of a gap width.

In FIG. 1, the objects to be welded are indicated as workpieces A and B which are positioned on a workpiece table WT by using a jig (not shown). These workpieces A and B form a gap G which extends substantially along an X-axis of the workpiece coordinate system already set in a robot. A gap width is a length in a Y direction. The gap width at a position where a value of the X axis of the coordinates is X (hereinafter, simply referred to as "a position x") is indicated as g(x).

A welding torch 2 and a laser sensor 3 are mounted, through a suitable mounting mechanism, on a distal end of the arm portion 1 of the robot, details of which are largely omitted for simplicity of illustration. Reference numeral 4 denotes a distal end portion of the welding torch, that is, the distal end point of the tool of the robot, which hereinafter will be also referred to as a weld point. The laser sensor 3 is disposed in such a manner that a scanning beam 5 always scans a region preceding the weld point with respect to an advancing direction of the robot. Loci 6A and 6B of a bright spot formed on the workpieces A and B or the workpiece table WT by the scanning beam 5 are detected by a light detecting unit of the laser sensor 3, and a position of a weld line and the gap width g(x) are determined based on the detected loci.

Figure 2:
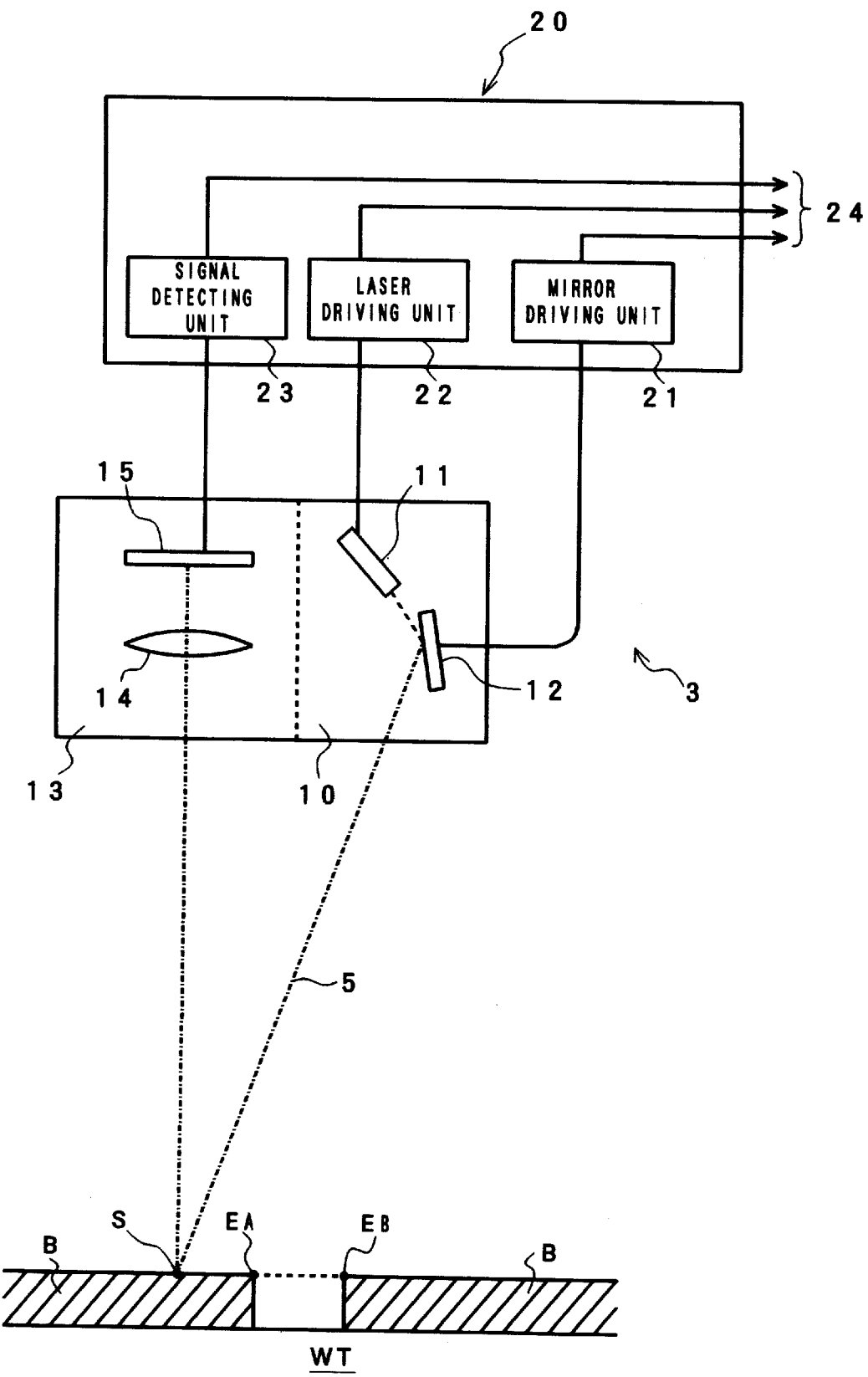
FIG. 2 is a diagram which shows a structure of a laser sensor used in an embodiment of the present invention.
Figure 3:
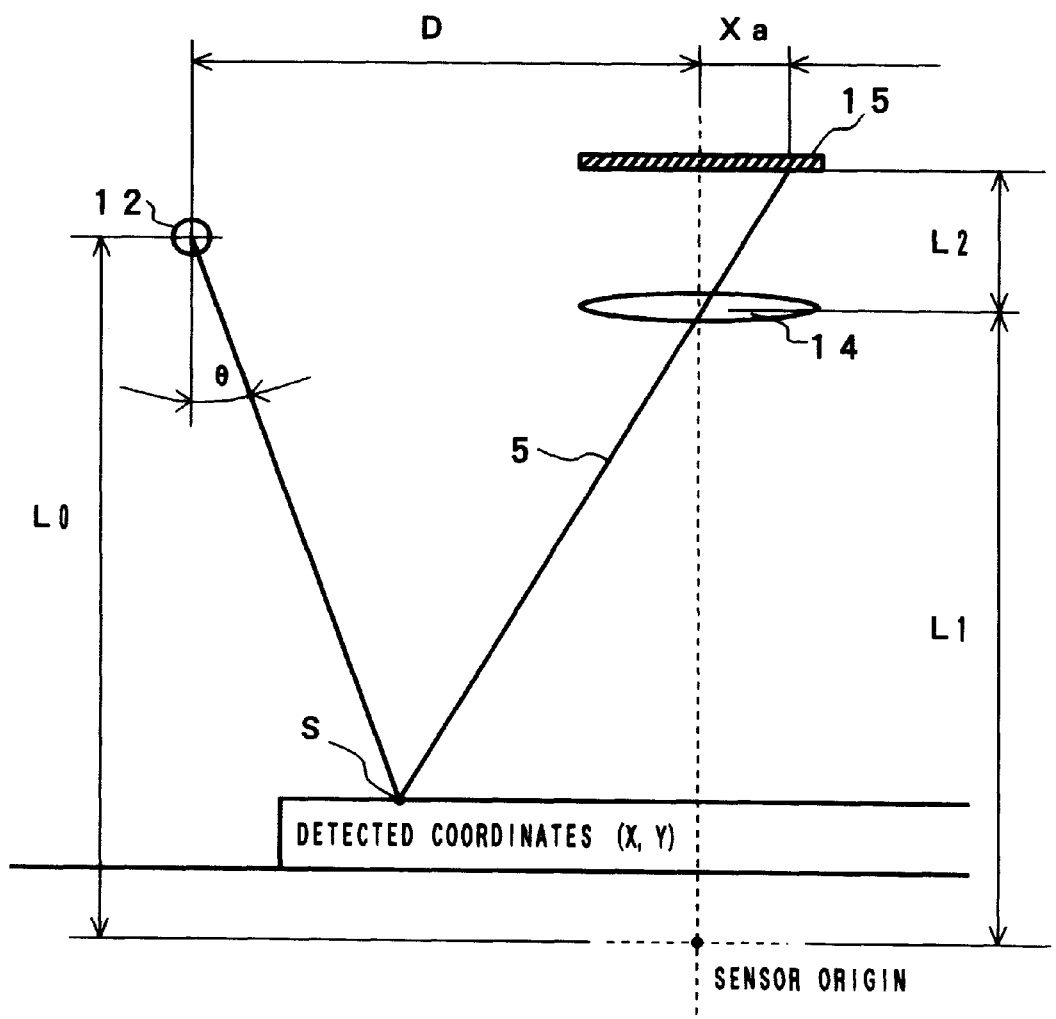
FIG. 3 is a diagram explaining a method for determining a position of a reflecting point on a coordinate system of a sensor from a position detected by a light receiving element of the laser sensor.

As structure, function and measurement principle measurement of a laser sensor and how to determine a gap width g(x) by the laser sensor are well known, they will be briefly explained here with reference to FIGS. 2 and 3. FIG. 2 shows a schematic diagram illustrating the structure of the laser sensor used in the embodiment of the present invention. A body portion of the laser sensor 3 comprises a projecting unit 10 and a light detecting unit 13, and the projection unit 10 is provided with a laser oscillator 11 and an oscillating mirror (a galvanometer) 12 for beam scanning. Further, the light detection unit 13 is provided with an optical system 14 for image formation and a light receiving element 15.

On the other hand, a laser sensor control unit 20 includes a mirror driving unit 21 for oscillating the oscillating mirror 12, a laser driving unit 22 for driving the laser oscillator 11 to generate a laser beam, and a signal detection unit 23 for detecting a position of incidence of the laser beam 5 to the object on the basis of a light receiving position in the light receiving element 15 respectively. These units are also connected to general-purpose interfaces (to be described later) of a robot controller through a circuit 24.

When the laser driving unit 22 receives an operation command to the laser sensor 3 from the robot controller through the circuit 24, the laser driving unit 22 drives the laser oscillator 11 to generate the laser beam 5. In parallel to this, the oscillation of the oscillating mirror 12 is started by the mirror driving unit 21, thereby causing the laser beam generated by the laser oscillator 11 to scan the surface of the subject.

The laser beam diffusely reflected at a reflecting point S on the surface of the object forms an image on the light receiving element 15 by the optical system 14 in accordance with a position of the reflecting point S. The light receiving element 15 consists of either a one-dimensional CCD array serving as a separate type light receiving element, or a position sensing device (PSD) serving as a non-separate type integrating element, or a CCD camera having a two-dimensional CCD array.

In this embodiment, it is assumed that a one-dimensional CCD array is used as the light receiving element 15. A light (an image of the reflected light) striking the light receiving surface of the light receiving element 15 is converted into photo-electrons and is stored in a cell thereof. Electric charges stored in the cell are outputted from an endmost one in successive order for each predetermined period in accordance with the CCD scanning signal from the signal detecting unit 23, and are transferred to the robot controller through the signal detection unit 23 and the circuit 24.

The scanning period of the CCD is set to be sufficiently shorter (for example, one several hundredth) than the scanning period of the oscillating mirror 12, so that the changes in the oscillating angle of the oscillating mirror 12 and the changes in the output state of the CCD element can be detected at any time. The output state of the CCD element is detected by the position of the cell (by number of the cell) having a maximum output, so that the cell position on which the reflected light falls can be detected. From this position, the position of the reflecting point S on the sensor coordinate system can be determined.

FIG. 3 is a diagram explaining a method for determining a position (Xs, Ys) of a reflecting point S on the sensor coordinate system from a position S detected by the light receiving element 15. It is assumed that the origin (0, 0) of the sensor coordinate system is on a line connecting a center of the optical system 14 and a center point of the light receiving element 15. This line is assumed to be a Y-axis, while an axis perpendicular to the Y-axis is assumed to be an X-axis.

Then, it is assumed that a distance from the origin of the sensor coordinate system to the center of the optical system is L1, a distance from the center of the optical system to the center of the light receiving element 15 is L2, a distance from the origin of the coordinate system to the oscillation center of the oscillating mirror 12 in the X-axis direction is D, a distance from the origin of the coordinate system to the oscillation center of the oscillating mirror 12 in the Y-axis direction is L0, an angle of the reflected light of the laser beam by the oscillating mirror 12 with respect to the Y-axis direction is θ, and the light receiving position of the light receiving element 15 on the light receiving surface is S. Then, values Xs and Ys on the coordinates of the reflecting point S of the laser beam 5 can be determined by solving the following simultaneous equations (1) and (2).

$$Xa/L2 = Xs/(L1-Ys) \quad (1)$$

$$(L-0Ys) \tan \theta = D - Xs \quad (2)$$

The position (Xs, Ys) of the reflecting point S determined on the sensor coordinate system is converted into three dimensional data on a coordinate system recognized by the robot (for example, 0-XYZ shown in FIG. 1) by using the attitude data of the robot and the calibration data (representing the relation between the sensor coordinate system and the robot coordinate system).

A series of data obtained for every scanning cycle of the laser beam 5 is analyzed by a software operation within the robot controller, whereby the position of edges EA and EB of the workpieces A and B can be determined. When these are given as (xea, yea, zea) and (xeb, yeb, zeb), the position of the weld line can be determined by the following equations, for example, as a position (xq, yq, zq) of a middle point Q of the edges EA and EB.

$$xq = (xea + xeb)/2 \quad (3)$$

$$yq = (yea + yeb)/2 \quad (4)$$

$$zq = (zea + zeb)/2 \quad (5)$$

Figure 4:
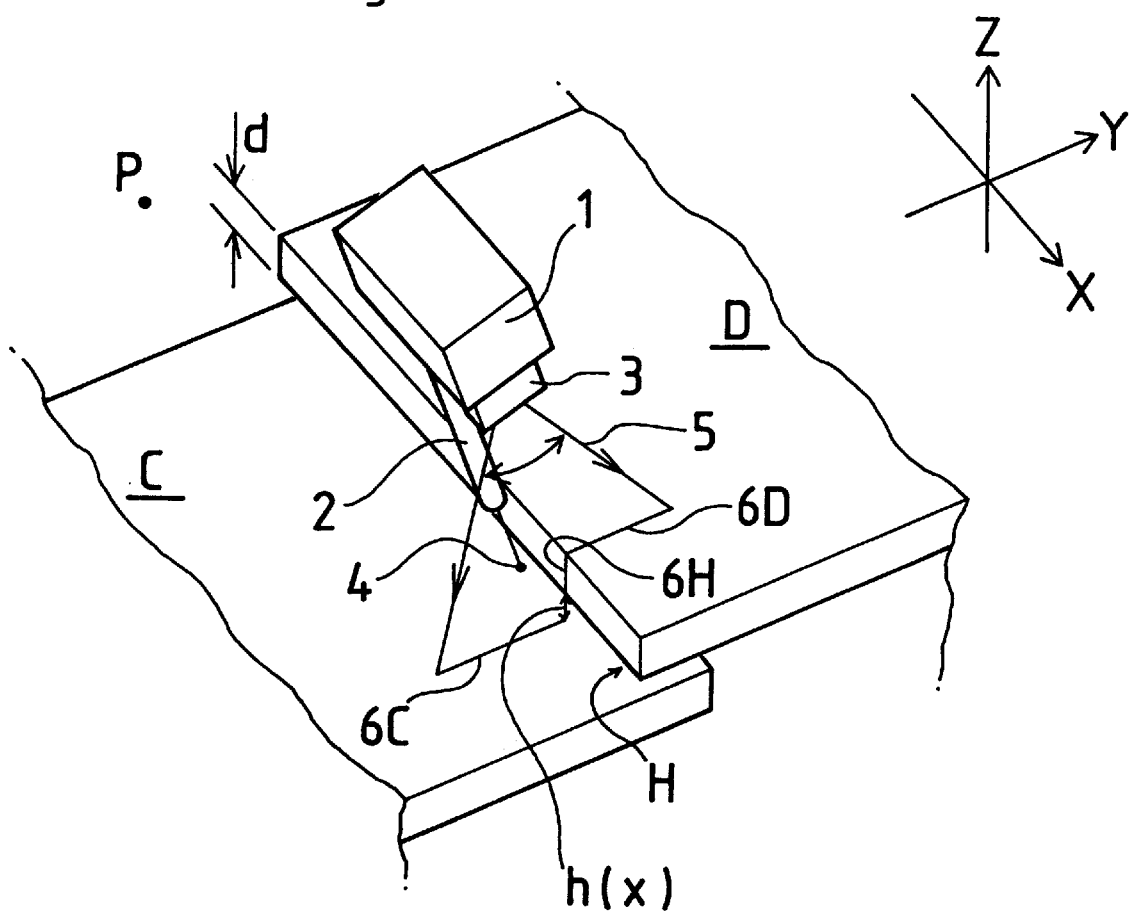
FIG. 4 is a schematic diagram explaining an arrangement for applying the present invention to lap welding and detection of a gap length.

The application of the present invention is not limited to a multi-layer welding for a butt welding portion, and the present invention can be applied to a welding portion of any type as far as the detection of the gap width by the laser sensor is possible. FIG. 4 is a schematic diagram explaining an arrangement and a gap width detection process when applying the present invention to a lap welding. The explanation of this diagram is made using the same reference numeral for an element corresponding to the element shown in FIG. 1. In FIG. 4, reference symbols C and D denote workpieces to be welded to constitute a joint, and a thickness d of at least the upper workpiece D is assumed to be known. A gap H in the Z-axis direction extending in the X-axis direction in the workpiece coordinate system already set in the robot exists between overlapping portions of the workpieces to be welded. It is assumed that a gap width at the position x is h(x). The welding torch 2 and the laser sensor 3 are mounted on the distal end portion 1 of the robot through a suitable mounting mechanism. The reference numeral 4 denotes the distal end portion (the weld point) of the welding torch set as the distal end point of the tool of the robot.

The laser sensor 3 is disposed in a manner such that a scanning beam 5 scans an area preceding the weld point with respect to an advancing direction of the robot. Further, in this embodiment, welding is performed in a manner such that the whole comprising the distal end portion 1 of the robot arm, the welding torch 2 and the laser sensor 3 are inclined in a direction crossing each of the X, Y and Z axes at a certain angle of not a right angle.

The structure and the function of the laser sensor 3 are as described above. In this embodiment, loci 6C, 6H and 6D of the bright spot formed on the workpieces C and D by the scanning beam 5 are detected. The reference symbols 6C and 6D respectively denote the loci formed on the plane surface of the workpieces C and D, and the reference symbol 6H denotes the locus extending along the edge portion of the work D in substantially Z-axis direction. In this case, the end portion of the locus 6C on the side of the gap H may be unclear since this portion is concealed behind the workpiece D.

Figure 5:
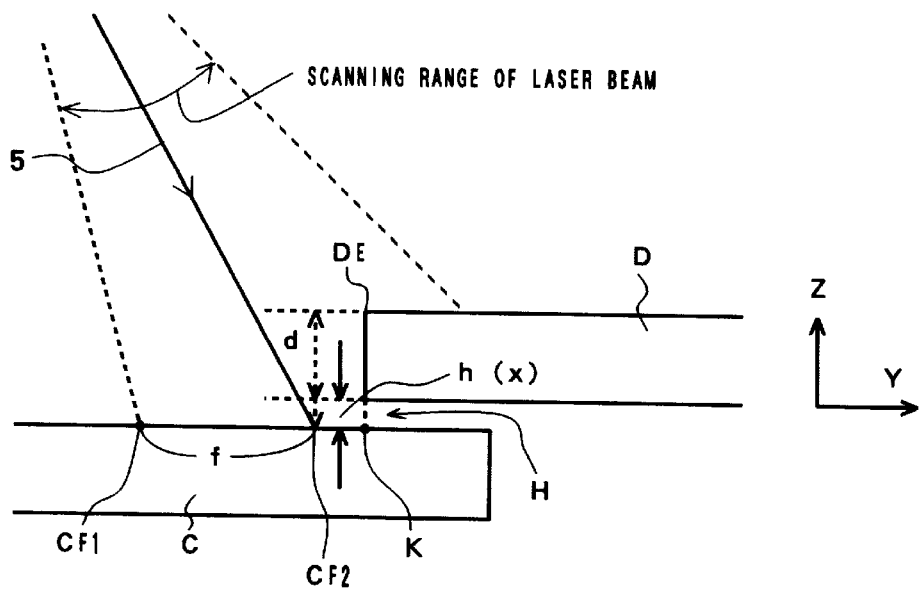
FIG. 5 is a diagram explaining a method for measuring a gap length h(x) by using a three dimensional position detecting function of the laser sensor.

FIG. 5 is a diagram illustrating a method for measuring a gap width h(x) by using a three-dimensional position detecting function of the laser sensor 3 described above. As shown in the figure, the gap width h(x) is determined by subtracting a thickness d of the workpiece D from a height of an edge DE of the workpiece measured from the plane surface of the workpiece C. In this case, since the difference in level between two overlapping workpieces extends to the Z-axis direction, when it is assumed that a value of the edge DE in the Z-axis direction is zde, and a value of the plane surface of the workpiece C in the Z-axis direction is zf, the gap width h(x) can be determined by the following equation.

$$h(x) = zde - zf - d \quad (6)$$

The Z-coordinate value zf of the plane surface of the workpiece C can be determined, for example, as the Z-coordinate value of the point CF2 on the plane surface of the workpiece C, the point CF2 being apart from the point CF1, the end point of the scanning range on the workpiece C, by a suitably set constant distance (or by a constant scanning angle). FIG. 5 exemplifies a state that the laser beam 5 falls on the point CF2.

The position of the weld point can be determined, for example, as a lowermost position K(xk, yk, zk) of the gap H by the following equations.

$$xk = xde \quad (7)$$

$$yk = yde \quad (8)$$

$$zk = zf \quad (9)$$

The present invention does not set any limitation to the measuring method of the gap width by using the laser sensor, and gap width can be determined by any methods other than the above method. As for a laser sensor to be used, for example, a CCD camera or a position sensing device (a PSD) can be used for the light detecting unit.

Figure 7:
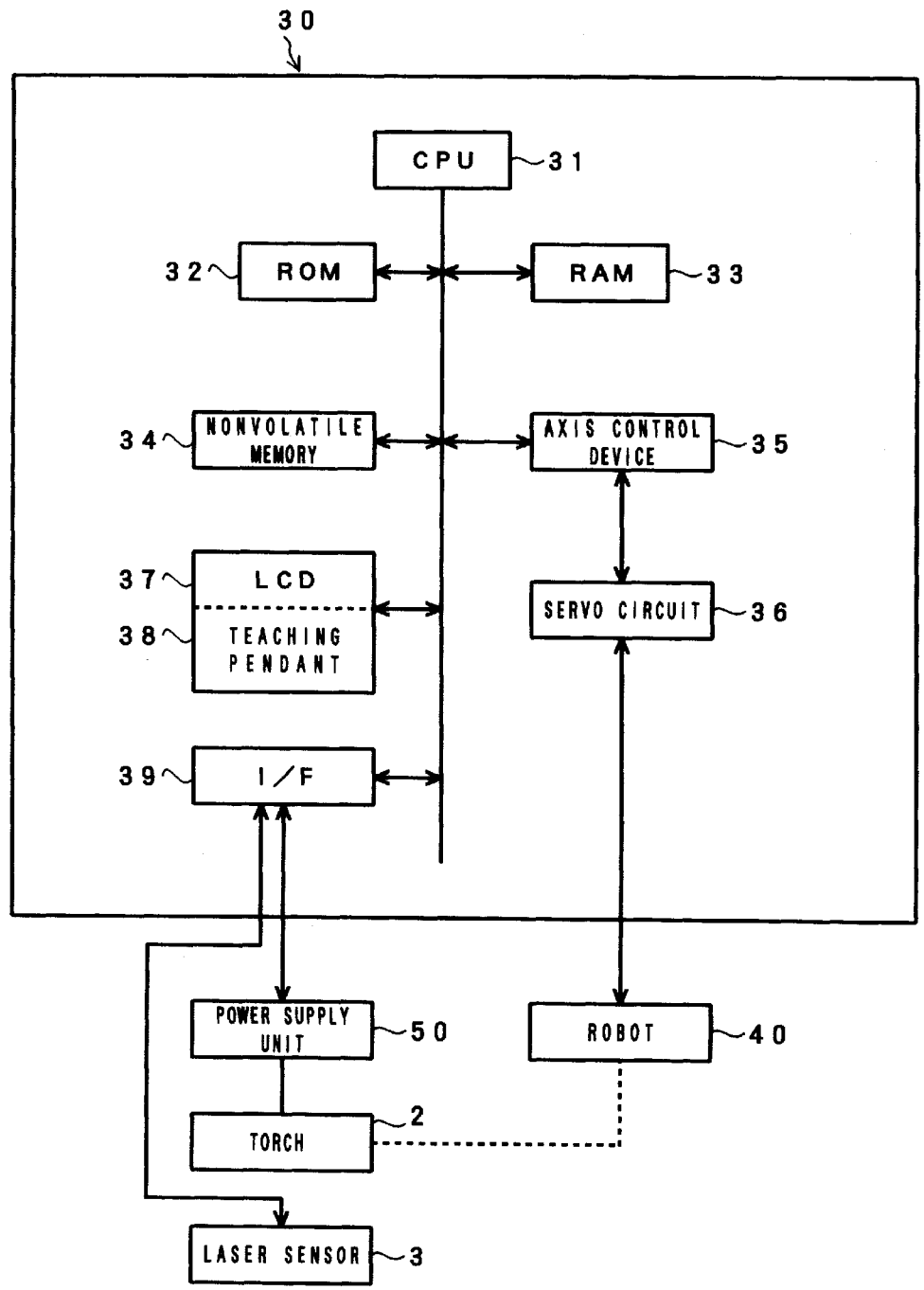
FIG. 7 is a block diagram of a system including a robot controller to be used in performing the present invention.

Next, the total structure of the system including the robot controller which can be used in performing the present invention will be described below with reference to the schematic block diagram shown in FIG. 7. As shown in the diagram, a robot controller 30 for controlling the total system has a central processing unit 31 (hereinafter referred to as CPU). The CPU 31 is connected by a bus to a memory 32 consisting of a ROM, a memory 33 consisting of a RAM, a nonvolatile memory 34, a robot axis controlling device 35, a teaching pendant 38 provided with a LCD 37 and a general-purpose interface 39 for connection to the external apparatus.

A program for controlling the total system including the robot controller 30 itself is stored in the ROM 32. This program includes a program necessary for inputting, through display screen, data for performing the present invention in accordance with the modes described later. A part of the RAM 33 is used for temporarily storing the data for the operation which the CPU 31 performs. Further, in order to realize the present invention, some buffer registers for storing sensing data, path correction data and the like, to be described later, are provided in the RAM 33. Some position registers for storing position data and path shift amount data for multi-layer welding are provided within the nonvolatile memory 34.

Figure 6:
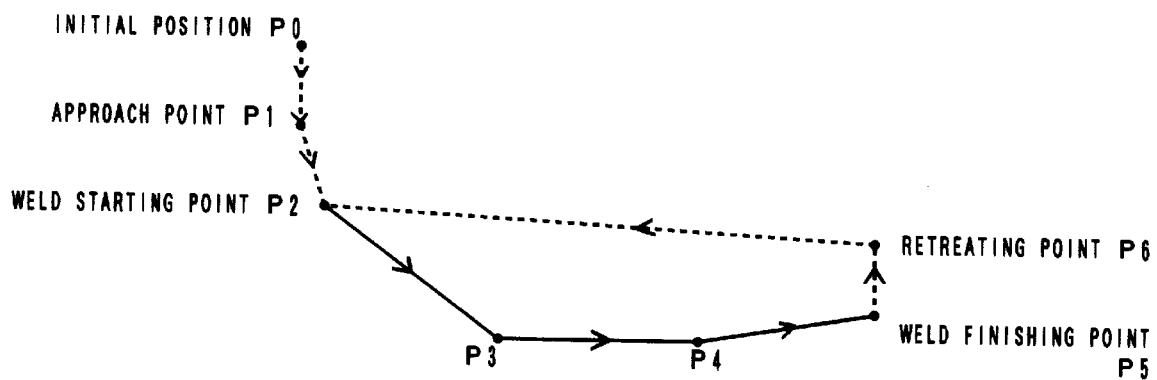
FIG. 6 is a diagram explaining a teaching path in accordance with an embodiment of the present invention.

As a teaching path to be stored in the nonvolatile memory 34 by teaching, a path including six teaching points as shown in FIG. 6 is assumed. In the diagram, sections P2–P3, P3–P4 and P4–P5 shown by a solid line are welding sections, and welding is not performed in the remaining sections shown by a broken line. A gap shown in FIG. 1 (in the case of a butt welding) or in FIG. 4 (in the case of a lap welding) is assumed to exist in each of the welding sections P2–P3, P3–P4 and P4–P5. An aiming angle (an attitude around the X-axis direction) of the torch 2 and an advancing angle (an inclination with respect to the X-axis direction) are specified in the form of the position data in accordance with the operating program for each of the sections.

When the reproduction of the operating program is started, the robot advances from an initial position (home position) P0 through an approach point P1 to a weld starting point P2, and there starts welding for the first layer. Then, the robot successively performs the welding for the first layer with respect to the sections P2–P3, P3–P4 and P4–P5, and finishes the welding for the first layer at a weld finishing point P5.

The robot returns, by way of retreating point P6, to the weld starting point P2 from the weld finishing point P5, and there starts welding for the second layer. Next, the robot successively performs the welding for the second layer with respect to the sections P2–P3, P3–P4 and P4–P5, and finishes the welding for the second layer at the weld finishing point P5. In a similar manner, the welding by the robot, which operates N number of times (for N layers) specified by operating program, is repeated, thereby completing the multi-layer welding.

In this embodiment, the multi-layer welding in accordance with the present invention is performed under the following conditions:

(1) The number of the welding layers is five (N=5).

(2) The adaptive welding control in accordance with the present invention is performed for all of the second to fifth layers.

(3) The welding conditions to be controlled by the adaptive welding control are a welding voltage, a welding current, a welding speed (a moving speed of the robot), a shift amount of a path, a weaving condition and a shift amount of the torch attitude. However, the welding voltage and the welding current are not independently controlled, but are controlled as a set to be selected from among predetermined conditions in response to the gap length.

The contents of the operating program and the condition setting will be exemplified below, and further, the operation to be performed by the robot controller 30 will be described below. In the following description, the conditions and the values specified in each of the embodiments are examples.

FIG. 8 shows an example of the operating program. In this program, POSITION [1] to POSITION [6] respectively correspond to P1 to P6 in FIG. 6. Hence, the operation specified by each of the lines in this operating program can be summarized as follows (also refer to FIG. 6):

1: Movement to the approach point P1 (from the initial point P0) by moving individual axes. A rate of positioning is 100% (a temporary stop).

2: Movement to the weld starting point P2 by moving individual axes, and start of arc welding in accordance with the arc starting condition [1]. A rate of positioning is 40% (a speed is reduced, but not to zero). In this case, the arc starting conditions are conditions at a time of arc starting (for example, welding voltage and welding current), and a suitable number of conditions following the condition [1] are prepared.

3: start of tracking by using the laser sensor (named: MIGEYE) 3. The tracking conditions conform to the specification of the condition [3]. As described later, the specified contents of the tracking conditions include a schedule for the suitable control. Further, the path data prepared in parallel with the tracking data are stored in the buffer register [2]. It is important for the path data to include the gap data determined by the method described above in addition to the path correction data representing the difference between the taught path and the weld line. In this case, the path correction data are calculated as correction amounts in the Y-axis direction and the Z-axis direction when the forward welding direction in the respective welding sections is assumed to be in the X-axis direction.

4: A linear movement toward the point P3 at a specified speed of 25 mm/sec. A rate of positioning is 0% (smoothness is 100%).

5: A linear movement toward the point P4 at a specified speed of 25 mm/sec. A rate of positioning is 0% (smoothness is 100%).

6: A linear movement toward the weld finishing point P5 at a specified speed of 25 mm/sec, and finish of arc with the arc finishing condition [1]. A rate of positioning is 100% (a temporally stop). In this case, the arc finishing conditions are conditions at a time of arc finishing (for example, welding voltage and the welding current at a time of arc stopping), and a suitable number of conditions following condition [1] are prepared.

7: To finish a tracking. Accordingly, the storage of the path correction data in the buffer register [2] is also finished.

8: Movement to the retreating point P6 by moving individual axes. A rate of positioning is 40% (speed is reduced, but not to zero).

9: Performing multi-layer welding by using the path data stored in the buffer register [2] and the path shift data stored in the position register [4]. The path data include the gap data in addition to the path correction data. Of the tracking conditions, when an adaptive welding control is set to be effective for the second and subsequent layers, the adaptive welding control will be performed in the welding for the second and subsequent layers.

Figure 9A:
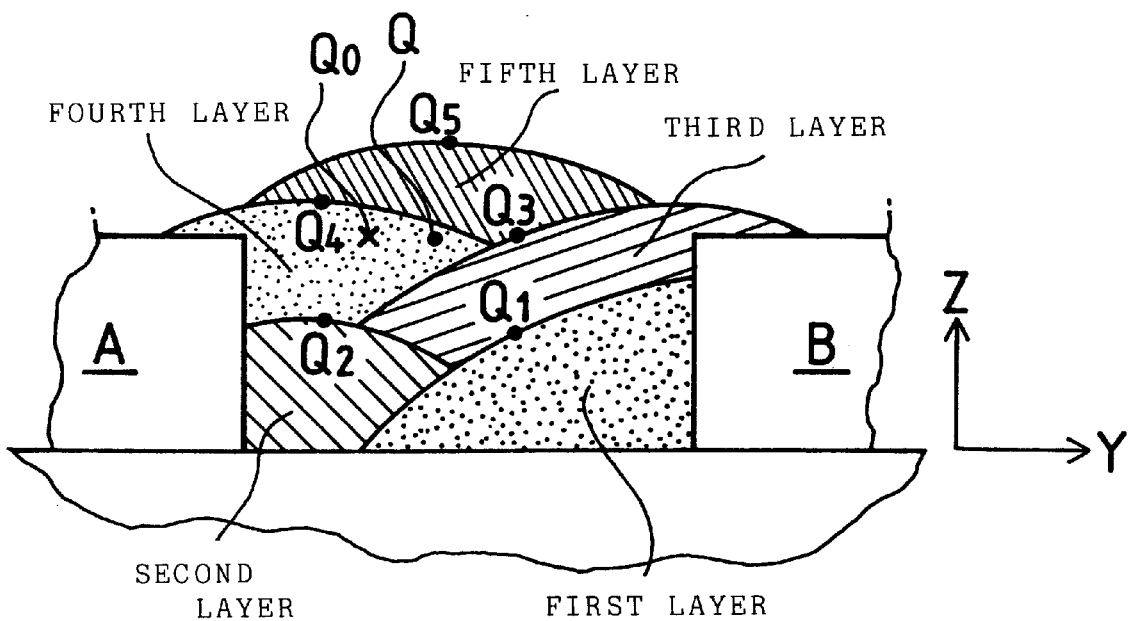
FIG. 9A is a diagram explaining that, in the butt welding, a suitable shift amount on a welding path varies depending on the layers of the multi-layer welding.

Here, an explanation will be made as to the path shift data. The path shift data is made available for further path shift on the basis of the position of the robot corrected by the path correction data, and, in general, a suitable shift amount varies depending on different welding layers. FIG. 9A exemplifies the state of the butt welding and FIG. 9B exemplifies the state of lap welding.

Figure 9B:
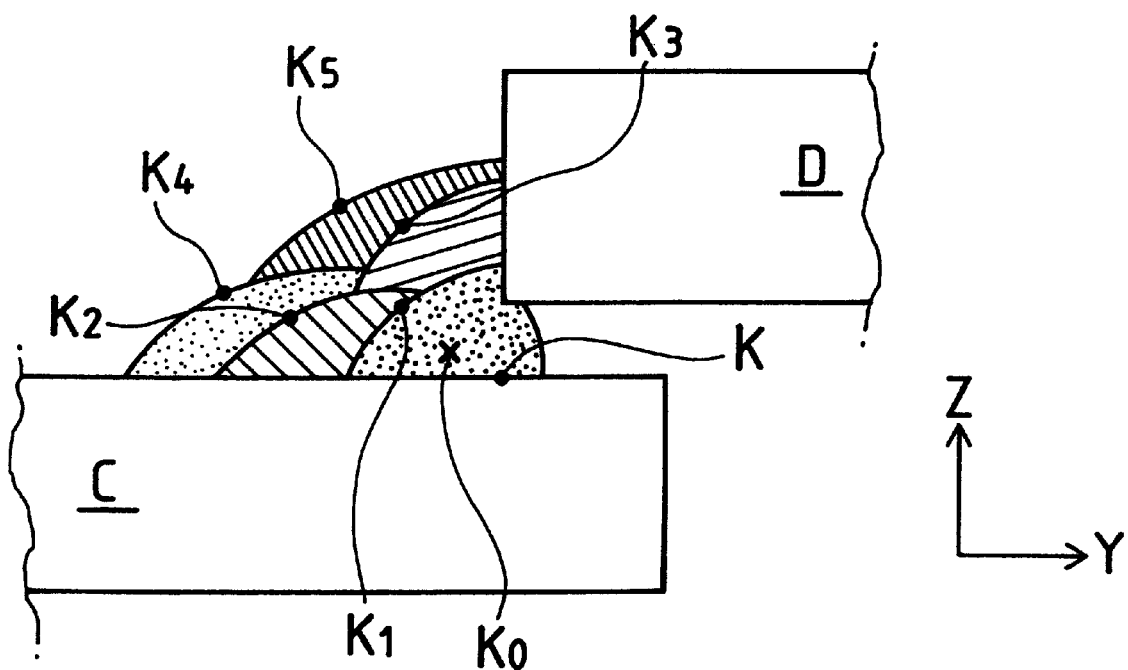
FIG. 9B is a diagram explaining that, in the lap welding, a suitable shift amount on welding path varies depending on the layers of the multi-layer welding.

A point Q of FIG. 9A and a point K of FIG. 9B respectively indicate the positions of the weld line detected when welding the first layer. It should be noted, however, that a certain degree of freedom be given in defining the position of the weld line. In this case, the point Q is defined by the above equations (3), (4) and (5), and the point K is defined by the above equations (7), (8) and (9). On the other hand, point Q0 of FIG. 9A and point K0 of FIG. 9B indicate the positions of the taught weld lines. The positional difference of the point Q from the point Q0 and the positional difference of the point K from the point K0 (vector amounts Q0 and Q1 or K0 and K1 respectively having Y and Z components) are respectively stored, as the path correction data, in the buffer register.

Next, the point Q1 of FIG. 9A and the point K1 of FIG. 9B respectively indicate the suitable positions of the robot when welding for the first layer. The positional difference between the points Q and Q1 or between the points K and K1 (the vector amounts QQ1 or KK1 respectively having the Y and Z components) is represented by the offset amount at the time of tracking, which will be described later. In the case where the weld line position is defined so that it agrees with the position of the distal end point of the tool which is defined to be suitable for the welding for the first layer, the offset amount at the time of tracking is set to 0, so that the point Q1 substantially coincides with the point Q, or the point K1 substantially coincides with the point K.

On the other hand, the points Q2 to Q5 in FIG. 9A and the points K2 to K5 in FIG. 9B respectively indicate the suitable positions of the robot when forming the second to fifth weld layers. The positional differences between each of these points and the point Q or the point K (the vector amount QQj or KKj having the Y and Z components, where j=2, 3, 4, 5) are specified by the path shifting.

Further, in general, it is considered that the suitable shift amount also varies depending on the change in the gap width. Then, as described later, according to the present invention, the final target position of the robot is determined by further adding another shift amount to the shift amount specified by the path shift data in performing the adaptive welding control for the second and subsequent layers. The explanation of the respective lines of the operating program of FIG. 8 will be continued below:

10: A linear movement toward the weld starting point P2 at a specified speed of 200 mm/sec, and start of arc welding in accordance with the same arc starting condition [1] as that for the first layer. A rate of positioning is 0% (smoothness is 100%). 11: A linear movement toward the point P3 at a specified speed of 25 mm/sec. A rate of positioning is 0% (smoothness is 100%).

12: A linear movement toward the point P4 at a specified speed of 20mm/sec. A rate of positioning is 0% (smoothness is 100%).

13: A linear movement toward the weld finishing point P5 at a specified speed of 25 mm/sec, and finish of arc with the same arc finishing condition [1] as that for the first layer. A rate of positioning is 100% (a temporary stop).

14: Temporal finish of multi-layer welding which is started by the instruction of the line number 9.

As mentioned above, the welding for the second layer is completed by practicing the instructions of the line numbers 9 to 14. As mentioned above, as far as the designation for making an adaptive welding control effective for the second and subsequent layers in the tracking conditions, the welding for the second and subsequent layers is performed under the adaptive welding control.

The weldings for the third to fifth layers are repeatedly performed according to the instructions of the line numbers 15 to 35 in a similar manner. The welding for each of the layers is basically performed according to the same instruction; however, the number of the position register (the argument of the POSITION REGISTER) in the instruction for starting the welding for each layer in multi-layer welding differs. This is because the path shift amount specified each time differs. However, in the case where the data for specifying the path shift amount at every layer number (here, 2, 3, 4 and 5) are put together in one position register having one number, the number of the position register is repeated at every layer. In this case, since the same path data (which is obtained when welding for the first layer) is used for every layer, the number of PATH DATA (argument) is common to all the layers.

The tracking condition is set on the setting screen displayed on the LCD 37 of the teaching pendant 36 as exemplified in FIG. 10. In this embodiment, four kinds of conditions (conditions 1 to 4) are set. The tracking condition referred to in line number 3 of the operating program shown in FIG. 8 corresponds to condition 3. The requirements specified by the respective line numbers can be summarized as follows:

12: The Y component of the difference between the points Q and Q1 or between the points K and K1 in FIGS. 9 and 10 is specified.

13: The Z component of the difference between the points Q and Q1 or between the points K and K1 in FIGS. 9 and 10 is specified.

The position of the distal end of the torch in the first layer is adjusted by these offsets. When the offset is set to 0, tracking control is performed so that the detected position of the weld line and the position of the distal end of the tool (normally in accord with the position of the distal end of the torch) agree with each other.

15: The condition of an adaptive welding control at welding for the first layer is set by the condition number. Setting to "0" means that an adaptive welding control will not be performed (refer to CONDITION 1 and CONDITION 2). The contents corresponding to the other condition numbers are set on the screen of FIG. 12, which will be described later.

16: Execution (EFFECTIVE)/non-execution (INVALID) of conditions of an adaptive welding control when practicing "MULTI-LAYER" welding for the second and subsequent layers is set. In this embodiment, "INVALID" is specified by CONDITION 1, and "EFFECTIVE" is specified by CONDITION 2, 3 and 4.

17: By setting a cursor to <PARTICULARS>, the screen for setting an adaptive welding schedule when performing the "MULTI-LAYER" welding for the second and subsequent layers is invoked.

FIG. 11 shows an example of the adaptive welding schedule setting screen. The setting of the adaptive welding schedule is made by specifying the condition number. The contents of the adaptive welding condition specified by each of the condition numbers are further displayed on the screen shown in FIG. 12. The set contents can be changed by operating the keyboard. Taking into consideration the fact that [2] and [3] are specified in CONDITION 3 (specified by an operating program) in FIG. 10 and on the screen in FIG. 11 for setting an adaptive welding schedule, contents of CONDITION 2 and CONDITION 3 are shown in FIG. 12.

However, it should be noted that the values and the like are only examples. The meanings of various items are as follows:

RANGE; Range of the gap width. 1 for 0.0 mm and more but less than 2.0 mm. 2 for 2.0 mm and more but less than 3.5 mm. 3 for 3.5 mm and more but less than 4.0 mm. 4 for 4.0 mm and more but less than 5.2 mm. 5 for 5.2 mm and more but less than 8.0 mm 6 for 8.0 mm and more. In this case, a symbol * is attached to each of the columns of 6 indicating gap width of 8.0 mm and more. This symbol * means an output of an error signal (while the robot is stopped and the welding).

WELDING; Conditions for a welding voltage and a welding current. Those conditions are specified by the condition number. Examples of the contents to be set by corresponding numbers are shown in a lower portion of FIG. 12.

V (mm/sec); A welding speed (a moving speed of the robot by the command) expressed in a mm/sec unit.

Y (mm); A Y component of the path shift amount to be added for the purpose of an adaptive welding control.

Z (mm); A Z component of the path shift amount to be added for the purpose of the adaptive welding control.

WEAVING; A condition for a weaving, which is specified by the condition number. Examples of the set contents for each of the numbers is shown in the lower portion of FIG. 12. Weaving patterns expressed by weaving pattern numbers in the same examples are separately set (detailed explanation is omitted). Condition number 0 indicates no weaving.

TARGET; A target angle (in degrees or radians) to be added to the taught torch attitude for the purpose of an adaptive welding control.

ADVANCE; An advance angle (in degrees or radians) to be added to the taught torch attitude for the purpose of an adaptive welding control. The case in which both the "TARGET" and "ADVANCE" are 0 (refer to the condition 2) means performing welding in accordance with the taught torch attitude.

For easier understanding of an adaptive welding control, the control conditions for the first layer and the second layer are summarized as follows in accordance with the operating program of FIG. 8 and the set examples shown in FIGS. 9 to 12:

First layer

Tracking; A real-time tracking is performed by the laser sensor in accordance with the condition 3 set on the screen of FIG. 10.

Adaptive welding control: An adaptive welding control in accordance with the gap width is performed according to the condition 3 set on the screen of FIG. 12.

Path correction data and gap width data: They are written in the buffer register 2.

Second layer

Tracking: Real-time tracking is not performed by the laser sensor, but a tracking on the basis of the path correction data read out from the buffer register 2 is performed.

Path shift: Path shift by shift amount stored in the position register [4] is carried out (refer to the point Q2 in FIG. 9A or the point K2 in FIG. 9B).

Adaptive welding control: An adaptive welding control on the basis of the gap width data read out from the buffer register 2 is carried out under the condition 3 set on the screen of FIG. 12.

Next, the content of the processing to be performed within the robot controller 30 will be summarized below for the first layer and the second layer respectively.

First layer

Figure 13:
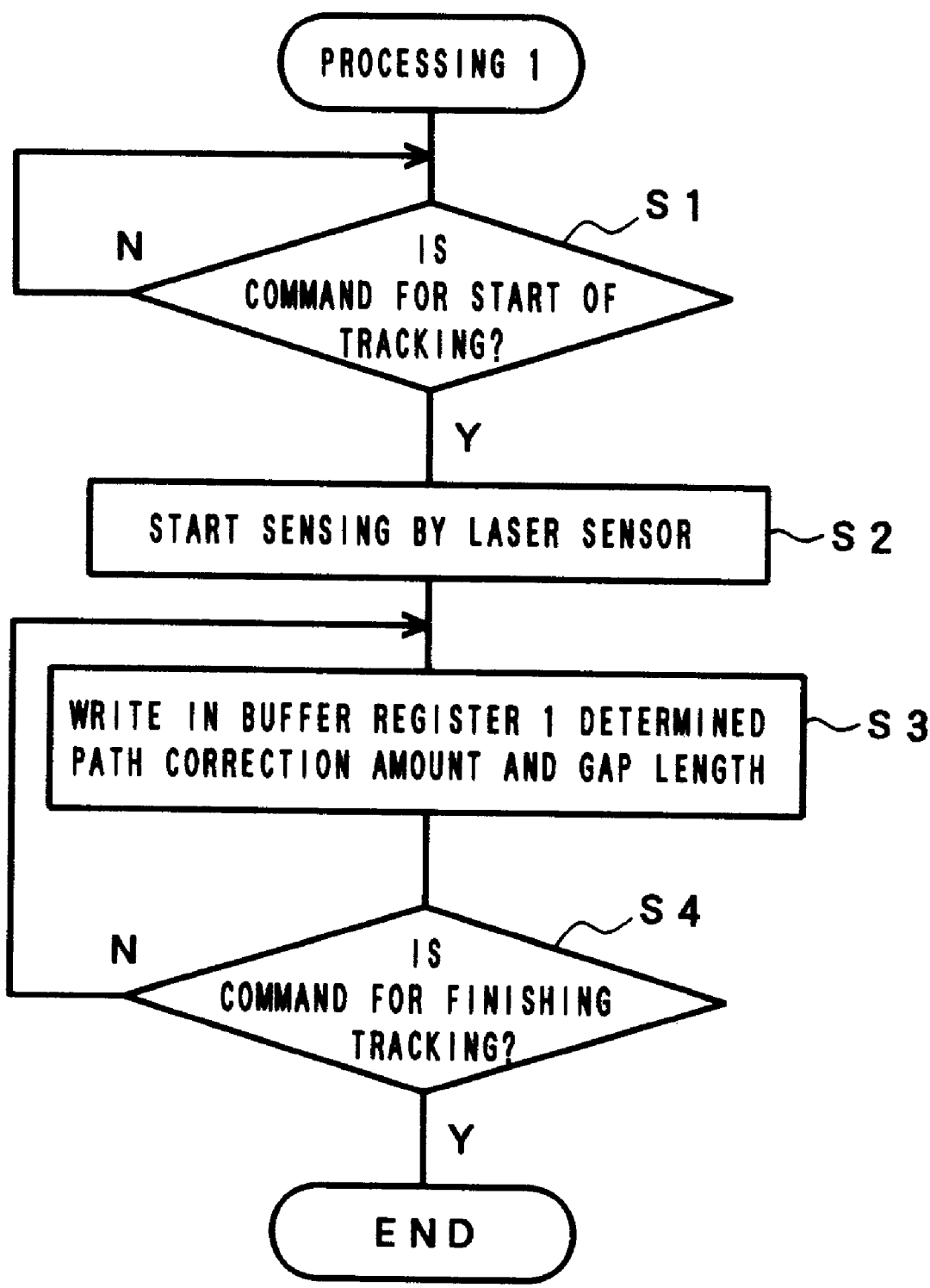
FIG. 13 is a flow chart explaining a first operation in accordance with the embodiment of the present invention.
Figure 14:
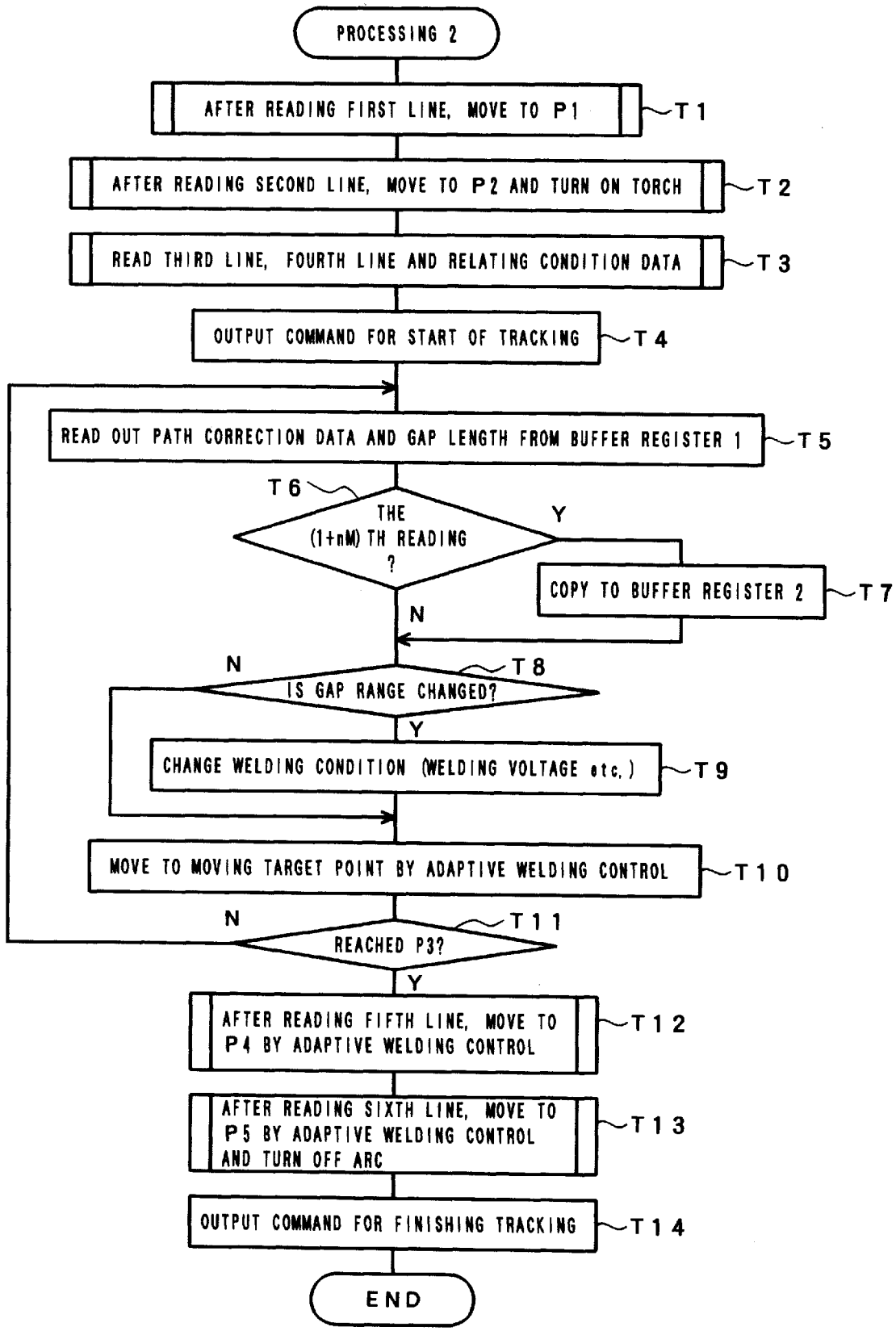
FIG. 14 is a flow chart explaining a second operation in accordance with the embodiment of the present invention.

The processing 1 shown in the flow chart of FIG. 13 and the processing 2 shown in the flow chart of FIG. 14 are performed in parallel according to the task function.

The processing 1 is for creating data for the racking and the adaptive welding control (for the first layer). In the processing 1, after the tracking start command is outputted in the processing 2 (step S1), to be described after, sensing by the laser sensor is started (step S2). In accordance with the method mentioned above, the path correction amount and the gap width are determined on the basis of the edge position of the workpiece detected by the laser sensor and are written in the buffer register 1 (step S3). Until the tracking termination command is outputted in the processing 2 (step S4), to be described later, the sensing by the laser sensor and the data storage in the buffer register 1 are repeated. When the tracking termination command is outputted, the processing is completed.

The processing 2 is for executing welding for the first layer by performing tracking and an adaptive welding control in a parallel manner. First, reading the first line of the operating program shown in FIG. 8, processing for moving the robot to the point P1 is performed (step T1). Further, reading the second line thereof, the robot is moved to the point P2, and the torch is turned on (step T2).

Then, reading the third line and the fourth line, the relating data specified there are read (step T3). Since the contents of the relating data were explained above with reference to FIGS. 8 to 12, the description thereof is omitted here. Further, reading the fifth line, a command for starting the tracking is outputted (step T4). Therefore, since storing of the path correction data and the gap width data is started in the operation 1, the stored data are read out (step T5).

Then, if the present reading of the data is the (1+nM)th, the contents thereof is copied in the buffer register 2 (step T6 and T7), in which n is 0 or a positive integral number, and M is a positive integral number which is suitably set for specifying the sampling interval. For example, if M=5, the path correction data and the gap width data are written in the buffer register 2 at the first, sixth, eleventh, sixteenth . . . readings (in this case, M=1 is also possible).

In the subsequent step T8, the gap width data read out from the buffer register 1 is checked with respect to the range to which they belong (refer to the explanation of "RANGE" in FIG. 12). The range is compared with the preceding range, and if it is found that the range is changed, the welding conditions (the welding voltage, the welding current, the welding speed, the path shift, the weaving condition and the torch attitude; refer to the relating explanation in FIG. 12) are changed accordingly (step T9). For the data read out at the first reading, it is assumed that a gap range is changed without condition.

Then, under the adaptive welding control on the basis of these conditions, a target point for moving is determined by using the path correction data and processing for moving to the target point is performed (step T10). The steps T5 to T10 are repeated until the robot reaches the point P3. When the point P3 (step T11) is reached, the next fifth line is read out, and the movement for tracking under the adaptive welding control to the point P4 is performed by repeating the same processings as those of the steps T5 to T11 (step T12).

Next, again in the same manner, the sixth line is read out, and the movement for tracking, under the adaptive welding control, to the point P5 is performed, and then the torch is turned off (step T13). Subsequently, the command for terminating the tracking is outputted (step T14) to complete the processing for the first layer.

Second layer

Figure 15:
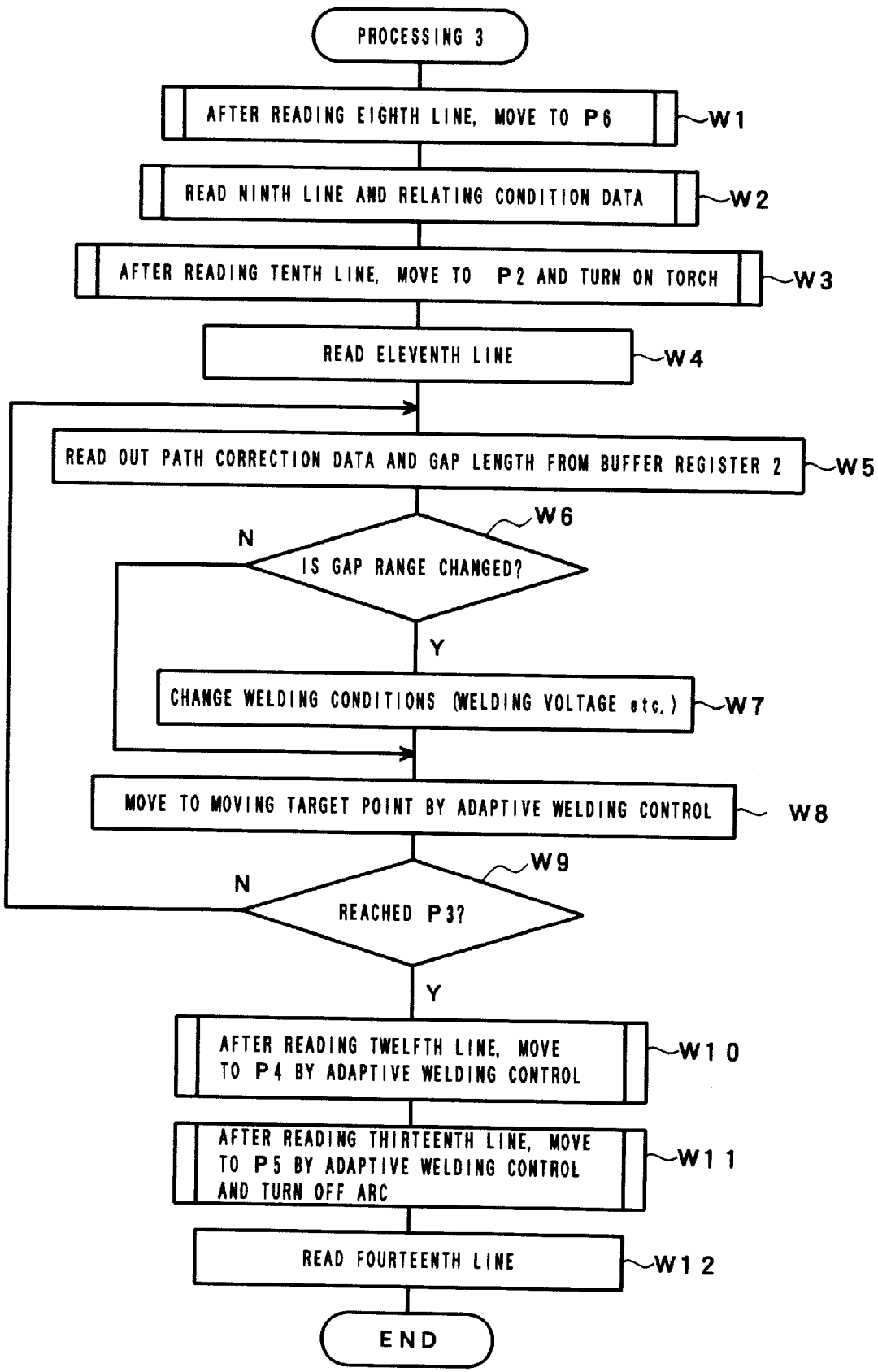
FIG. 15 is a flow chart explaining a third operation in accordance with the embodiment of the present invention.

The processing 3 shown in the flow chart of FIG. 15 is performed. The sensing by the laser sensor is not performed.

The processing 3 is for performing the multi-layer welding by an adaptive welding control (for the second and subsequent layers) while reproducing the tracking path of the first layer. First, the eighth line of the operating program shown in FIG. 8 is read, and the processing for moving the robot to the point P6 is performed (step W1). Further, the ninth line and the relating data specified therein are read out (step W2). Since the contents of the relating data was already explained with reference to FIGS. 8 to 12, the explanation thereof is omitted here.

Further, reading the tenth line, the robot is moved to the point P2, and then the torch is turned on (step W3). Next, reading the eleventh line, the operation of multi-layer welding is started (step W4).

First, the path correction data and the gap width data are read out from the buffer register 2 (step W5). In subsequent step W6, the gap width data read out from the buffer register 2 is checked as to the range (refer to the explanation of "range" in FIG. 12) to which they belong. The range is compared with the preceding range, and, if the range is changed, the welding conditions (the welding voltage, the welding current, the welding speed, the path shift, the weaving condition and the torch attitude; refer to the relating explanation in FIG. 12) are changed accordingly (step W7). For this data read out at the first reading, it is assumed that a gap range is changed without condition.

Then, under the adaptive welding control on the basis of these conditions, the target point for moving is determined by using the path correction data and processing for moving to the target point is performed (step W8). The steps W5 to W7 are repeated until the robot reaches the point P3. Upon reaching the point P3 (step W8), the next twelfth line is read out, and the movement under the adaptive welding control is made by repeating the same processings as those of the steps W5 to W7 (step W10).

Next, again in the same manner, the thirteenth line is read out, and the moving under the adaptive welding control to the point P5 is carried out, and then the torch is turned off (step W11). Subsequently, after the fourteenth line is read (step W12) the operation for the multi-layer welding (for the second layer) is completed.

What is claimed is:

1. A control method in a multi-layer welding which uses a welding robot having an arc welding torch and a laser sensor mounted thereon, comprising steps of:

setting, in advance, relationships among a width of a gap existing in a portion to be welded and welding conditions;

continuously or successively detecting the width of the gap existing in the portion to be welded along a weld path by using the laser sensor while performing welding for a first layer, and storing detected data concerning the gap width in a memory; and performing welding for a second layer and a subsequent layer or layers under said welding conditions determined in accordance with the gap width stored in said memory.

2. A control method in a multi-layer welding according to claim 1, further comprising a step of performing a tracking of the weld line with said welding robot on a real time basis, when welding for the first layer, and using data obtained by sensing said weld line in advance with a sensor mounted on said robot.

3. A control method in a multi-layer welding according to claim 2, further comprising steps of:

storing path correction data which was used in said real-time tracking of the weld line by said welding robot in said memory together with said gap width; and performing correction of the path of said welding robot by using the path correction data stored in said memory, while weldings for the second and subsequent layer or layers are performed.

4. A control method in a multi-layer welding according to claim 3, further comprising a step of performing a welding with the welding conditions controlled in accordance with the gap width detected by the real-time tracking of said laser sensor.

5. A control method in a multi-layer welding according to claim 1, wherein said welding conditions include at least one of a welding voltage, a welding current, a welding speed, a path shift amount, a weaving condition and a torch attitude.

6. A control method in a multi-layer welding according to claim 1, wherein a path shift is performed separately from the control of said welding conditions in the welding for each of the layers.

7. A control method in a multi-layer welding according to claim 1, wherein said portion to be welded is a portion formed by work pieces to be welded, which are arranged to butt against each other.

8. A control method in a multi-layer welding according to claim 1, wherein said portion to be welded is a portion formed by work pieces to be welded, which are arranged to have a difference in level.

9. A welding control system comprising a welding robot mounting an arc welding torch and laser sensor thereon, and a robot controller for controlling the operation of said robot, said laser sensor being arranged in a manner such that a scanning beam may scan an area preceding a weld point with respect to an advancing direction of the robot, said robot controller comprising:

weld line and gap width calculating means for obtaining information on the weld line from a three-dimensional position information of the portion to be welded, which is detected by said laser sensor while performing welding for a first layer and calculating a width of the gap of the portion to be welded which lies on the weld line;

gap width storage means for storing data concerning the gap width of the portion to be welded which lies on said weld line;

welding condition storage means for storing predetermined relationships between the gap width of said portion to be welded and the welding conditions; and welding condition outputting means for obtaining a gap width of the portion to be welded which lies on the weld line from a current position of the robot by using said gap width memory means, determining welding conditions in accordance with the gap width by using said welding condition storage means, and outputting the determining welding conditions to the robot for a second and a subsequent welding layer or layers.

10. A control method for multi-layer welding, comprising:

storing, in advance, relationships between a width of a gap in a portion to be welded and corresponding welding conditions;

detecting the width of the gap existing in the portion to be welded along a weld path while performing welding for a first layer, and storing the detected gap width data; and performing welding for at least second and third additional layers under the welding conditions determined in accordance with the stored gap width data.

* * * * *

UNITED STATES PATENT AND TRADEMARK OFFICE
CERTIFICATE OF CORRECTION

PATENT NO.: 6,023,044
DATED : February 8, 2000
INVENTOR(S): Tetsuya KOSAKA, et al.

It is certified that [an/error[s]] appears in the above-identified patent and that said Letters Patent is hereby corrected as shown below:

Col. 2, line 57, delete "a".

Col. 3, line 61, insert --,-- after "5".

Col. 5, line 18, equation 2, change "(L-0Ys) to --(L0-Ys)--.

Col. 5, line 28, insert --,-- after "5".

Col. 9, line 37, "11" begins a new paragraph.

Signed and Sealed this

Nineteenth Day of December, 2000

Attest:

Q. TODD DICKINSON

*Attesting Officer*  *Commissioner of Patents and Trademarks*